(12) United States Patent
Urban et al.

(10) Patent No.: US 10,082,945 B2
(45) Date of Patent: Sep. 25, 2018

(54) SYSTEMS AND METHODS OF DYNAMICALLY PROVIDING INFORMATION AT DETECTION OF EXIT INTENT ON A MOBILE COMPUTING DEVICE

(71) Applicant: Bounce Exchange, Inc., New York, NY (US)

(72) Inventors: Ryan Joshua Urban, New York, NY (US); Bing Wu, Flushing, NY (US); Benzion Gribetz Rubin, New York, NY (US); Joseph West, Brooklyn, NY (US); Namik Abdulzade, Middle Village, NY (US)

(73) Assignee: Bounce Exchange, Inc., New York, NY (US)

( * ) Notice: Subject to any disclaimer, the term of this patent is extended or adjusted under 35 U.S.C. 154(b) by 0 days.

(21) Appl. No.: 15/410,810

(22) Filed: Jan. 20, 2017

(65) Prior Publication Data

US 2017/0212874 A1    Jul. 27, 2017

Related U.S. Application Data

(60) Provisional application No. 62/281,407, filed on Jan. 21, 2016.

(51) Int. Cl.
*G06F 17/30* (2006.01)
*G06F 3/0485* (2013.01)
(Continued)

(52) U.S. Cl.
CPC ...... *G06F 3/0485* (2013.01); *G06F 17/30873* (2013.01); *G06F 17/30899* (2013.01);
(Continued)

(58) Field of Classification Search
CPC ..... H04L 67/02; H04L 67/22; G06F 3/04842; G06F 3/0482; G06F 3/04883;
(Continued)

(56) References Cited

U.S. PATENT DOCUMENTS

| 5,191,641 A | 3/1993 | Yamamoto et al. |
| 6,204,845 B1 | 3/2001 | Bates et al. |
| (Continued) | | |

FOREIGN PATENT DOCUMENTS

| EP | 2766865 A1 | 8/2014 |
| JP | 2002268994 A | 9/2002 |
| (Continued) | | |

OTHER PUBLICATIONS

"Grey out a webpage", the electric toolbox, Jun. 26, 2009, retrieved on Aug. 12, 2016, <http://www.electrictoolbox.com/grey-out-webpage>.

(Continued)

*Primary Examiner* — Rinna Yi
(74) *Attorney, Agent, or Firm* — Morris & Kamlay LLP

(57) ABSTRACT

Systems and methods are provided to determine that an input to the web browser that displays a web page on a mobile computing device is received, and compare a determined property of the received input with at least one reference value that corresponds to the property. An intent to exit the displayed webpage is detected when the determined property of the received input is the same as or exceeds the at least one reference value. A message is displayed on the display of the mobile computing device based on the determination of intent to exit the displayed web page.

28 Claims, 11 Drawing Sheets

(51) Int. Cl.
 *G06F 3/0483* (2013.01)
 *H04L 29/08* (2006.01)
 *G06Q 30/02* (2012.01)

(52) U.S. Cl.
 CPC ....... *G06F 3/0483* (2013.01); *G06Q 30/0269* (2013.01); *G06Q 30/0277* (2013.01); *H04L 67/22* (2013.01)

(58) Field of Classification Search
 CPC ... G06F 3/0483; G06F 11/34; G06Q 30/0241; G06Q 30/0277; G06Q 30/02; G06Q 30/0201; G06Q 30/0269
 See application file for complete search history.

(56) References Cited

U.S. PATENT DOCUMENTS

| | | | |
|---|---|---|---|
| 6,326,985 | B1 | 12/2001 | Tazoe et al. |
| 6,636,247 | B1 | 10/2003 | Hamzy et al. |
| 6,763,379 | B1 | 7/2004 | Shuster |
| 8,160,925 | B2 | 4/2012 | Anand et al. |
| 8,165,915 | B1 | 4/2012 | Lucash et al. |
| 8,224,693 | B2 | 7/2012 | Lukose et al. |
| 8,230,334 | B2 | 7/2012 | Park |
| 8,280,773 | B2 | 10/2012 | Srinivasan |
| 8,566,696 | B1 | 10/2013 | Hamon |
| 8,645,212 | B2 | 2/2014 | Urban |
| 8,806,327 | B2 | 8/2014 | Morris |
| 8,881,050 | B2 | 11/2014 | Kim |
| 8,930,437 | B2 | 1/2015 | Ball |
| 8,965,885 | B2 | 2/2015 | Venkateswaran |
| 9,329,759 | B1* | 5/2016 | Hill ..................... G06F 3/04842 |
| 2002/0147741 | A1 | 10/2002 | Hashimoto |
| 2005/0216866 | A1 | 9/2005 | Rosen et al. |
| 2005/0228775 | A1 | 10/2005 | Nilsen |
| 2006/0164386 | A1 | 7/2006 | Smith et al. |
| 2007/0185986 | A1 | 8/2007 | Griffin et al. |
| 2012/0005058 | A1 | 1/2012 | Buck |
| 2012/0158502 | A1 | 6/2012 | Chung et al. |
| 2012/0272136 | A1* | 10/2012 | Takami ............. G06F 17/30867 715/234 |
| 2012/0278742 | A1 | 11/2012 | Takami |
| 2012/0290974 | A1* | 11/2012 | Doig ................... G06F 17/3089 715/808 |
| 2012/0304073 | A1 | 11/2012 | Mandic |
| 2013/0290117 | A1* | 10/2013 | Urban ................ G06Q 30/0277 705/14.73 |
| 2013/0305170 | A1* | 11/2013 | de Souza ............. G06F 3/0485 715/760 |
| 2014/0053065 | A1 | 2/2014 | Yun |
| 2014/0380144 | A1 | 12/2014 | Liang |
| 2016/0239741 | A1* | 8/2016 | Bradley ................. H04L 51/06 |

FOREIGN PATENT DOCUMENTS

| | | |
|---|---|---|
| JP | 2007199382 A | 8/2007 |
| JP | 2011113280 A | 6/2010 |
| JP | 2011212534 A | 10/2011 |
| WO | 0139024 A2 | 5/2011 |

OTHER PUBLICATIONS

Atterer R et al., "Knowing the User's Every Move—User Activity Tracking for Website Usability Evaluation and Implicit Interaction", WWW '06 Proceedings of the 15th International Conference on World Wide Web, ACM, New York, NY, USA, pp. 203-212 (May 22, 2006).

Bit Repository, "Creating an Exit Modal Box Using the jQuery Library", www.bitrepository.com/exit-modal-box.html, posted on Apr. 25, 2009.

Etgen et al: "What does getting WET (Web Event-logging Tool) Mean for Web Usability?", Internet Citation, (Jun. 3, 1999), XP002332999, Retrieved Jun. 22, 2005: http://zing.ncsl.nist.gov/hfweb/proceedings/etgen-cantor/index.html.

Gunthrie, C., "Popup Domination vs Action Popup Plugin Comparison", www.youtube.com/watch?v=qYLr4j0mpDI, effective as of Mar. 17, 2015.

Hilaire, C., "What is an Exit Pop Up?", www.youtube.com/watch?v=a1oHU9f7A_s, effective as of Mar. 17, 2015.

Japanese Office Action dated Jan. 26, 2016.

Lea, T. "Creating a Jquery Exit Popup," www.tonylea.com/2011/creating-a-jquery-exit-popup/, Nov. 7, 2011.

Mitchell, S., "Prompting a User to Save When Leaving a Page", 4 Guys From Rolla.com, [retrieved from the Internet on Aug. 12, 2016]<URL: https://web.archive.org/web/20120207130740/http://www.4guysfromrolla.com/webtech/100604-1.shtml>.

Notice of Allowance dated Jul. 4, 2016 as received in JP Application No. 2015510394.

Office Action dated Nov. 13, 2015 as received in AU Application No. 201325.

Office Action dated Dec. 5, 2016 as received in GB Application No. GB 1420668.4.

Office Action dated Jun. 1, 2016 as received in EP Application No. 13784938.6.

Office Action dated Nov. 11, 2016 as received in GB Application No. 1614665.6.

Office Action dated Sep. 22, 2016 as received in GB Application No. 1420668.4.

Smith,"User Engagement: The Only Metric that Matters", SEO Design Solutions, [retrieved Aug. 12, 2016] https://web.archive.org/web/20120423064439/http://www.seodesignsolutions.com/blog/internet-marketing/user-engagement-the-only-metric-that-matters>.

International Search Report and Written Opinion dated Apr. 10, 2017 for PCT/US2017/014230.

* cited by examiner 10, 11

SYSTEMS AND METHODS OF DYNAMICALLY PROVIDING INFORMATION AT DETECTION OF EXIT INTENT ON A MOBILE COMPUTING DEVICE

BACKGROUND

Users are increasingly relying on mobile computing devices, such as smartphones, to view content on webpages. They are also using mobile computing devices to search for information, read publications, view or listen to media content, purchase products or services, and the like. With millions of webpages available, it may be difficult for a user to find the information that they are looking for. Many of these webpages are not optimized for viewing with mobile computing devices. Some webpages may have companion applications (i.e., "apps") to change the user experience in viewing information. Other webpages may present additional information when the webpage is first loaded to be viewed on the browser of the mobile device. However, users typically do not know about these companion applications, and the additional information provided may not be useful to the user. Users frequently experience difficulty in finding the information that they are interested in.

Some webpages encourage a user to engage or interact with them, for example, to find information, to request information, to learn, or to be entertained. However, the user can experience difficulty, frustration, or disinterest in engaging with the webpage. This typically leads to the user leaving the website while an interaction between the user and the website is occurring or is incomplete.

BRIEF SUMMARY

According to an embodiment of the disclosed subject matter, systems and methods are provided to determine, at a mobile computing device that displays a webpage in a web browser on a display, that an input to the web browser is received. The input may have at least one property that may include a slide operation, a scroll operation, a selection of a browser navigation button, a change in display screen size of the web browser, a webpage exit option, a force, a dwell time, a direction, a velocity, and an acceleration. The determined property of the received input is compared with at least one reference value that corresponds to the property. The at least one reference value stored at the mobile computing device. Based on the comparing at the mobile computing device, an intent to exit the displayed webpage is determined when the determined property of the received input is the same as or exceeds the at least one reference value. A message is displayed on the display of the mobile computing device based on the determination of intent to exit the displayed web page.

According to an embodiment of the disclosed subject matter, systems and methods are provided to determine, by at least a mobile computing device, whether at least one received scroll operation input or slide operation input is the same as or exceeds at least one reference value that corresponds to the at least one scroll operation input or slide operation input. The at least one reference stored at the mobile computing device. An intent to exit a displayed webpage may be determined when it is determined that the received input is the same as or exceeds the at least one reference value. A message based on the determined intent to exit may be displayed on the display of the mobile computing device.

According to an embodiment of the disclosed subject matter, systems and methods are provided to determine, at a mobile computing device, whether there is a change to a viewable size of a webpage displayed in the web browser based on a received user input. An intent to exit the displayed webpage may be determined when it is determined that there is a change to the viewable size of the webpage. A message may be displayed or the user may be redirected to information based on the determination of the intent to exit the displayed web page.

According to an embodiment of the disclosed subject matter, systems and methods are provided to determine whether at least one of an operation input and an activity is received at a user interface of a mobile computing device displaying a webpage on a display. When at least one of the operation input is equal to or greater than one or more threshold input values, the displayed webpage size changes, and an operational interface displayed on the mobile computing device changes, the systems and methods may determine an intent to exit the displayed webpage. Information that is selected and/or generated may be displayed on the display of the mobile computing device when the exit intent is determined.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1A:
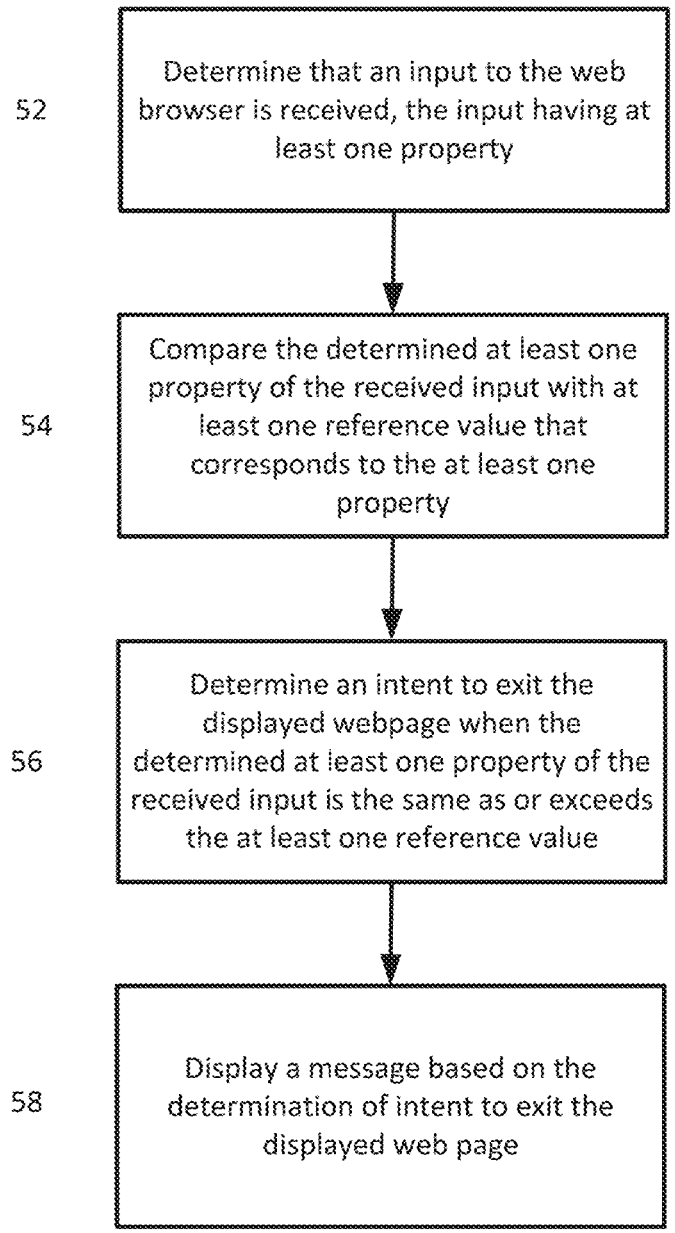
FIG. 1A shows an example method of determining exit intent, and displaying relevant information in a message on a mobile computing device according to an embodiment of the disclosed subject matter.

Websites may provide a variety of information, including textual information, graphical information, video, audio, and the like to users. In some examples, the information may be related to news, education, entertainment, products, services, and the like. With information dispersed over millions of websites on the Internet, it may be difficult for a user to quickly locate information on a particular website that may be of interest to the user. With the increasing use of mobile computing devices, such as smartphones, tablets, and wearable computing devices, users may have increased difficulty in searching for desired information on a website. That is, one problem addressed by embodiments of the disclosed subject matter is reducing the difficulty of locating information of interest on the Internet, and/or on a particular Internet webpage, when using a mobile computing device.

This difficulty in quickly locating information on the Internet may be based on the smaller screens typically associated with the mobile computing devices, which may make information more difficult to see for some users. Also, websites may not be optimized and/or adapted for use by a mobile computing device, which may increase the difficulty in finding desired information, and may frustrate users. This may cause users to leave a website before they can locate the information that they are interested in. Some websites may have a companion application (i.e., an "app") which users may purchase and/or download. However, a user may not have the application downloaded to their mobile computing device, may not know about the availability of the app, and/or may not know about how their experience in retrieving desirable information may be improved by using the application. In view of the above, another problem addressed by embodiments of the disclosed subject matter is detecting an intent to exit an Internet webpage by a user of a mobile computing device, and providing information of interest to the user in an overlay display on the webpage, or by dynamically altering the presently-displayed webpage to present the information of interest.

Similarly, it may be difficult for media providers, education providers, manufacturers, service providers, publishers, entertainment entities, and the like to attract and retain consumers and/or potential customers who are using mobile computing devices to visit their websites. That is, the screen size, user interface, and/or web browsing experience may increase the difficulty a user may have in finding desired information, compared with a traditional website viewing experience on, for example, a personal computer. This increased difficulty may lead to users attempt to exit a website before information that is of interest to the user may be presented and/or discovered by the user. This may decrease the opportunity for such entities to provide information, media, publications, products, services, or the like that a user may be interested in. Yet another problem addressed by the embodiments of the disclosed subject matter is detecting, by Internet website publishers and/or owners, an exit intent by a user viewing the website with a mobile computing device so as to provide the user with the information that they may be looking for before an exit occurs.

Embodiments of the disclosed subject matter address the problem of re-engaging a user with a website when an exit intent is determined. That is, a website may be interactive so as to encourage participation, discussion, comments, providing information, interactive entertainment, and the like. Some users may experience difficulty, frustration, or may not be sufficiently informed or motivated to continue to engage with the website, and may attempt to exit the website during an interaction, engagement, an information providing activity, or the like. The embodiments of the disclosed subject matter provide information, feedback, direction, and the like to users via webpage overlays and/or dynamically altering webpage content so as to re-engage the user with the website and encourage user interaction with the website.

Another problem addressed by the embodiments of the disclosed subject matter is that one or more user input operations to a mobile computing device may be determined to be an exit intent. That is, based on a user input to a user interface of a mobile computing device when a webpage is being displayed, the input may be determined to be an exit intent. The disclosed embodiments may display information of interest to a user when a user exit intent is determined from one or more scroll operations (e.g., a downward scroll operation with a subsequent upwards scroll operation, or the like), a slide operation, a selection of a browser navigation button (e.g., a selection to move forward or backward within a web page browsing history, a selection of a menu button, a bookmark list button, or the like), a selection to add a browsing tab, a change in display screen size of the web browser, a selection of a webpage exit option, a force, a dwell time, a direction, a velocity, and an acceleration, or the like. The information may be presented in an overlay and/or by dynamically adjusting the presently displayed web page so as to include the information of interest.

Embodiments of the disclosed subject matter may also address the problem of a user not completing a form or an action item on a webpage. For example, a webpage may request that a user enter information (e.g., name, mailing address, email address, payment information, comments, or the like), and the user may not complete the form. The non-completion of the form may be inadvertent (e.g., the user did not know that information was requested to be entered) or intentional (e.g., the user no longer wishes to enter the information, or may be frustrated with the entry process). When an exit intent is determined based on the non-completion of the form, information may be presented to the user via an overlay and/or by dynamically adjusting the content so that the user may be prompted to complete the action item and/or form.

That is, the disclosed embodiments address the problems discussed above relating to search and retrieval of information of interest to a user from one or more Internet websites using a mobile computing device, determining exit intent of a user to leave a web site presently displayed, providing information of interest when exit intent is determined and/or before exiting a webpage, well as other related problems.

Embodiments of the disclosed subject matter determine an exit intent of a user to leave a website being displayed on a mobile computing device. This intent to exit may be because a user may not have been able to locate desired information, request a service, purchase a product, provide contact information to receive information, and the like from the website. In embodiments of the disclosed subject matter, the exit intent may be determined when a received scroll operation input value is equal to or greater than a threshold scroll input value. Alternatively, or in addition, exit intent may be determined when a threshold percentage of the website is scrolled (e.g., 60%, 70%, 80%, or the like). Alternatively, or in addition, exit intent may be determined when a first scroll operation is followed by a second scroll operation. For example, a downward scroll input may be determined, and an upward scroll operation may be subsequently determined. That is, the exit intent may be determined from the subsequent upward scroll operation.

In some embodiments of the disclosed subject matter, exit intent may be determined when a user attempt to access an address bar to enter a website address, access a bookmark list, selects a menu button, view the browsing history, and/or switch to a different tab in a web browser. This interaction with the web browser by the user may change the viewable size of the displayed webpage. The detected change to the viewable size may be used to determine exit intent. In some embodiments, determining exit intent may be based on the type of web browser and/or the type of operating system being executed by the mobile computing device. When an exit intent is determined, information may be generated and/or selected to be displayed on the mobile computing device that may be of interest to the user. In some embodiments of the disclosed subject matter, the information may be generated and/or selected according to the website browsing history of the user, search query terms entered by the user, or the like. The generated and/or selected information may be displayed in an overlay that is presented over the presently displayed webpage. Alternatively, the presently displayed webpage may be dynamically altered to include the generated and/or selected information.

In some embodiments of the disclosed subject matter, exit intent may be determined based on data collected on a user that is associated with a mobile computing device. For example, and as discussed in detail below, the collected data may include user search criteria; user identification information, user preferences, user location, web browser information, characteristics of the mobile computing device, previous visit history with a web page, referral history, and the like.

FIG. 1A shows an example method 50 of determining exit intent, and displaying relevant information in a message on a mobile computing device (e.g., mobile computing device 10, 11 shown in FIGS. 2A-4) according to an embodiment of the disclosed subject matter. At operation 52, the mobile computing device may determine that an input to a web browser that is displayed on a display of the device is received. The input may have at least one property that may include, for example, slide operation, a scroll operation, a selection of a browser navigation button, a change in display screen size of the web browser, a webpage exit option, a force, a dwell time, a direction, a velocity, an acceleration, or the like. For example, an input may include a webpage exit option that may be a webpage tab a menu, a bookmark list button, a web address area, a home button, and an application. A scroll operation that may be an input may be one or more of an upward scroll operation and a downward scroll operation.

At operation 54, the mobile computing device may compare the determined at least one property of the received input with at least one reference value that corresponds to the at least one property. The at least one reference value may be stored at the mobile computing device, and may correspond to a value related to a slide operation, a scroll operation, a selection of a browser navigation button, a change in display screen size of the web browser, a webpage exit option, a force, a dwell time, a direction, a velocity, an acceleration, or the like. For example, the reference value may be a threshold percentage of the webpage that is scrolled by the upward scroll operation or the downward scroll operation. Based on this comparison, an intent to exit the displayed webpage may be determined at operation 56 when the determined at least one property of the received input is the same as or exceeds the at least one reference value.

A message based on the determination of intent to exit the displayed web page may be displayed on the display of the mobile computing device at operation 58. As described throughout, the message or an overlay may be used to deliver information and/or content to a user on the display of the mobile computing device, or the user may be redirected to another website that is displayed on the display of the mobile computing device. How the message is displayed on the display of the mobile computing device and/or the content of the message may be based on the type of determined intent to exit (e.g., a slide operation, a scroll operation, a selection of a browser navigation button, a change in display screen size of the web browser, a webpage exit option, or the like). As discussed below, the content of the message may be selected and/or generated based on information collected about a user associated with the mobile computing device.

The reference value that may be used for the comparison in operation 56 may be stored at the mobile computing device, and may be at least one of a threshold scroll value, a threshold slide value, at least one value corresponding to a threshold change in the display screen size of the web browser, or the link. The scroll operation may include a downward scroll operation that is equal to or greater than the threshold scroll value, and an upward scroll operation.

In some implementations, the message may be displayed on the display of the mobile computing device when the display screen size of the web browser (i.e., the viewable size of the display) is determined to change based on the comparison between the determined at least one property and the at least one reference value. For example, reference value may be the normal display size or a reduced display size. The received input may cause a change to the viewable screen size, and the change may be detected by comparing the present screen size with the reference value screen size. The detection may also occur when the web browser generates an output indicating that the screen size is changed.

In some implementations, the intent to exit may be determined based on a configuration of the mobile computing device. The configuration may include, for example, an operating system, a model of the mobile computing device, a manufacturer of the mobile computing device, at least one operational setting of the mobile computing device, or the like.

In some implementations, the message may be displayed on the display of the mobile computing device when it is determined that at least one of a back button, a forward button, a bookmark list button, a menu button, or the like is selected. The selection of a back button may be used to determine an intent to exit the displayed webpage. A message or an overlay may be used to deliver information and/or content to a user on the display of the mobile computing device, or the user may be redirected to another website that is displayed on the display of the mobile computing device.

This may be performed, in some implementations, by pushing to the web browser's history application program interface (API) using, for example, a pushState that has a window history state object corresponding to the web browser's then-current URL (uniform resource locator), and a custom triggering object. When a web browser event that corresponds to the selection of, for example, the back button (i.e., "popState") occurs, the custom triggering object in the history API may be read. This may prompt the mobile computing device to provide content to the user (e.g., a message, an overlay, and/or may redirect the user to another webpage). Since the then-current URL may be pushed to the history API via the history state object, the user (i.e., the webpage visitor) remains on the same webpage while the content loads, instead of being directed to the webpage URL prior to the activation pushing to the history API.

The above may be performed, for example, by transmitting, from a server to the mobile computing device, a window history state object that corresponds a web browser's currently displayed web page, and a custom triggering object. When the forward button or back button is selected, the mobile computing device may read the custom triggering object. A message may be displayed on the display of the mobile computing device based on the custom triggering object.

Certain mobile browser settings may use an additional event to occur (e.g., when the user touches the screen) to enable the web browser's history API to receive the pushState function.

If the web browser of the mobile computing device does not support the history API (and pushState), a polling rewind may be used. The polling rewind may, for example, add a hashtag to the browser URL upon page load that contains a period ".". The web browser may periodically monitor to see if the page has moved from a page with the special hashtag character to one without (i.e., meaning the back button has been selected). When a change is determined via the monitoring, the message or overlay may be displayed. The hashtag may be an example character that is used for monitoring purposes, but one or more other identifying characters may be suitably used and monitored.

The above example method may be performed by adding at least one identifying character (e.g., a hashtag character or the like) to the uniform resource locator (URL) of the webpage. The web browser may be monitored to determine when the webpage has changed from one which includes the at least one identifying character to one which the at least one identifying character is absent. A message may be displayed on the display of the mobile computing device, when the at least one identifying character is determined to be absent.

The mobile computing device or a server (e.g., server 13 and/or remote platform 17 shown in FIG. 4 and described below) may determine whether the webpage is on a webpage's landing page to enable strategic alternative actions to be taken (e.g., which message is to be generated and/or selected for a user).

In some implementations of method 50 shown in FIG. 1A, the mobile computing device may display at least one of a selectable image, selectable text, a selectable button, a selectable link, or the like. A user may be redirected to information of interest based on a selection of at least one of the selectable image, the selectable text, the selectable button, and the selectable link. If the user is redirected, the mobile computing device may display the information of interest in at least one of the displayed message, a different portion of a website that includes the displayed webpage, a new webpage of a different website from the displayed webpage, an advertisement, or the like.

A server (e.g., server 13 and/or remote platform 17 shown in FIG. 4 and described below) may be communicatively coupled to the mobile computing device, and the server may generate and/or select information to be included with the message that is displayed by the mobile computing device. The server may select and/or generate information to be provided with the message based on, for example, a type of exit intent (e.g., menu button is selected, back button is selected, a scrolling operation has occurred, a change in the display size has been detected, etc.) and/or based on data collected on the user associated with the mobile computing device. The generated and/or selected information may be transmitted from the server to the mobile computing device. The generated and/or selected information may be displayed in an overlay or may be displayed by dynamically adjusting the displayed webpage.

In some implementations, the determination of the intent to exit may be based on non-completion of a request for information from a user displayed on the display of the mobile computing device.

In some implementations, data associated with a user or the mobile computing device may be collected. The intent to exit the displayed webpage may be determined. This determination may be at least partially based upon the collected data associated with the user or the mobile computing device. The data associated with the user or the mobile computing device may be at least one of a web browser of the mobile computing device, an operating system of the mobile computing device, whether a computer programming code has been enabled or disabled on the mobile computing device, a network connection speed of the mobile computing device, an enabled cookie on the mobile computing device, screen resolution settings of the mobile computing device, received input to the web browser of the mobile computing device, or the like. The data associated with the user or the mobile computing device may include at least one of a user search criteria, user identification information, user preferences, user location, web browser information, characteristics of the mobile computing device, previous visit history with a web page, referral history, or the like. The collected data associated with the user or the user device is used to determine the message to be displayed on the display of the mobile computing device and/or how the message is displayed by the mobile computing device.

In some implementations, a method similar to the method 50 shown in FIG. 1A may be used to determine exit intent, and display information on a mobile computing device. The method may determine whether at least one received scroll operation input or slide operation input is the same as or exceeds a reference value. The reference value may correspond to the scroll operation input or slide operation input, the at least one reference stored at the mobile computing device. The received scroll operation may include a downward scroll operation that is the same as or exceeds at least one reference value, and an upward scroll operation. The reference value may be a threshold percentage of the webpage that is scrolled by the received scroll operation.

The mobile computing device may determine an intent to exit a displayed webpage when it is determined that the received input is the same as or exceeds the at least one reference value. A message may be displayed on the display of the mobile computing device based on the determined intent to exit. The contents of the displayed message may be based on the determined intent to exit.

In some implementations, the method may include collecting data associated with a user or the mobile computing device. The determining the intent to exit the displayed webpage may be based upon the collected data associated with the user or the mobile computing device. The data associated with the user or the mobile computing may include the web browser of the mobile computing device, an operating system of the mobile computing device, whether a computer programming code has been enabled or disabled on the mobile computing device, a network connection speed of the mobile computing device, an enabled cookie on the mobile computing device, screen resolution settings of the mobile computing device, received input to the web browser of the mobile computing device, or the like. The data associated with the user or the mobile computing device may include user search criteria, user identification information, user preferences, user location, web browser information, characteristics of the mobile computing device, previous visit history with a web page, referral history, or the like. The collected data associated with the user or the user device may be used to determine the message to be displayed on the display of the mobile computing device.

In some implementations, a method similar to the method 50 shown in FIG. 1A may be used to determine whether there is a change to a viewable size of a webpage displayed in the web browser displayed on a mobile computing device based on a received user input. The determination of the change of the viewable size of the webpage displayed in the web browser may be determined to be a change in a non-interface portion of the web browser of the mobile computing device. An intent to exit the displayed webpage may be determined by the mobile computing device when it is determined that there is a change to the viewable size of the webpage. A message may be displayed or the user may be redirected to information based on the determination of the intent to exit the displayed web page. The user may be redirected by the selecting at least one of a selectable image, selectable text, a selectable button, and a selectable link that may be displayed on the display of the mobile computing device.

Figure 1B:
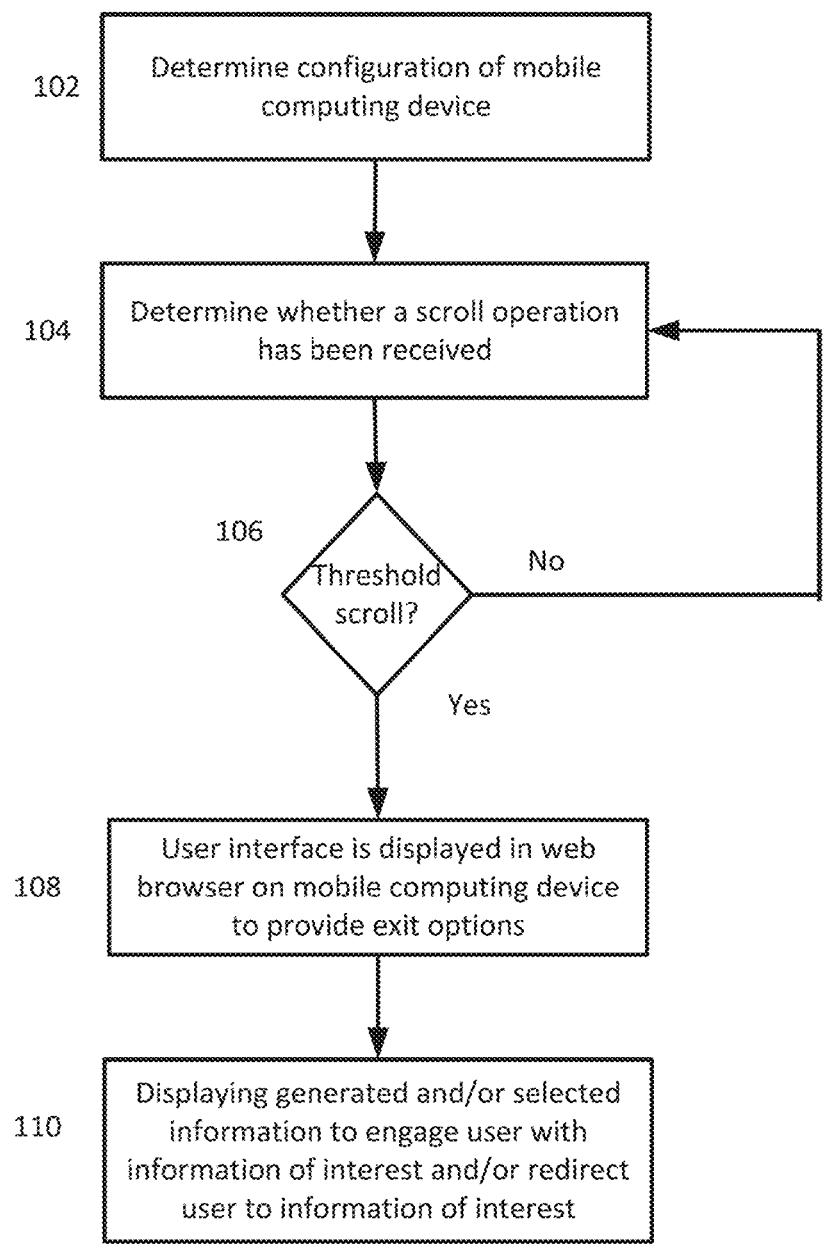
FIG. 1B shows another example method of determining exit intent, and displaying generated and/or selected relevant information on a mobile computing device according to an embodiment of the disclosed subject matter.

FIG. 1B shows an example method 100 of determining exit intent, and displaying generated and/or selected relevant information on a mobile computing device (e.g., mobile computing device 10, 11 shown in FIGS. 2A-4) according to an embodiment of the disclosed subject matter. At operation 102, the configuration of a user's mobile computing device may be determined. A server (e.g., server 13 and/or remote platform 17 shown in FIG. 4 and described below) and/or a mobile computing device (e.g., mobile computing device 10, 11 shown in FIGS. 2A-4) may determine a type of web browser and/or operating system that is operating on the mobile computing device 10, 11. For example, the web browser may be a Chrome™ web browser for a mobile computing device that is operating with the Android™ operating system or that is operating with iOS™ operating system. In another example, the web browser may be determined to be a Safari™ web browser for a mobile computing device that is operating with the iOS™ operating system. These web browsers and operating systems for the mobile computing devices are merely exemplary, and other suitable web browsers and/or operating systems may be detected.

At operation 104, the mobile computing device 10, 11 may determine whether a scroll operation has been received by a user interface (e.g., user input device 26 shown in FIG. 3) and/or detected (e.g., by user input detector 30 shown in FIG. 3) of the device 10, 11. At operation 106, the computing device 10, 11 may determine (e.g., by the exit intent detector 32 and/or processor 24 shown in FIG. 3) whether a threshold scroll input value has been received. When the threshold scroll input value has not been received (i.e., "No" as shown in FIG. 1B), the mobile computing device may continue to determine whether a scroll operation is received at operation 104.

A threshold scroll input value may be set in the computing device 10, 11 based on a direction (e.g., an "up" scroll direction, a "down" scroll direction), and/or may be based on a magnitude of the scrolling input received. The magnitude may be a percentage scrolled of the web page displayed on the user computing device. For example, the threshold value may be set to be receiving a scrolling input so that 60%, 70%, 80%, or the like of the web page being displayed is scrolled.

Alternatively, or in addition, operation 106 may determine whether a second scroll operation is subsequent to a first scroll operation that is equal to and/or exceeds a threshold scroll input value. For example, the second scroll operation may be an upward scroll operation, which may be received subsequent to a first scroll operation that is equal to or greater than a threshold scroll input value. Alternatively, or in addition, the threshold scroll determination in operation 106 may be when a second scroll is received that is in an opposite direction that a first scroll received. That is, the threshold scroll input may be the change in input scroll direction.

Figure 2A:
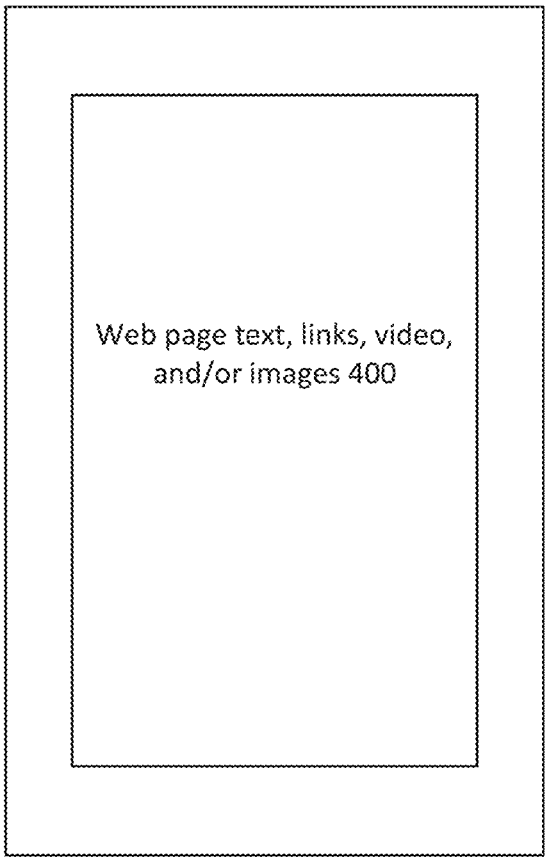
FIGS. 2A-2C show example displays of a mobile computing device depending on detected scroll operations according to an embodiment of the disclosed subject matter.

FIG. 2A shows the computing device 10, 11 having a display 400 which may include web page text, images, video, one or more selectable links to other web pages and/or other pages within the web site, and the like. The example display 400 as shown in FIG. 2A may not have received an input (e.g., a slide operation, a scroll operation, a selection of a browser navigation button, a change in display screen size of the web browser, a webpage exit option, or the like), or may have received an input that is less than the reference value. In some implementations, the display 400 may not have received, for example, an opposite scroll input (e.g., an upscroll after detecting a downscroll operation).

Figure 2B:
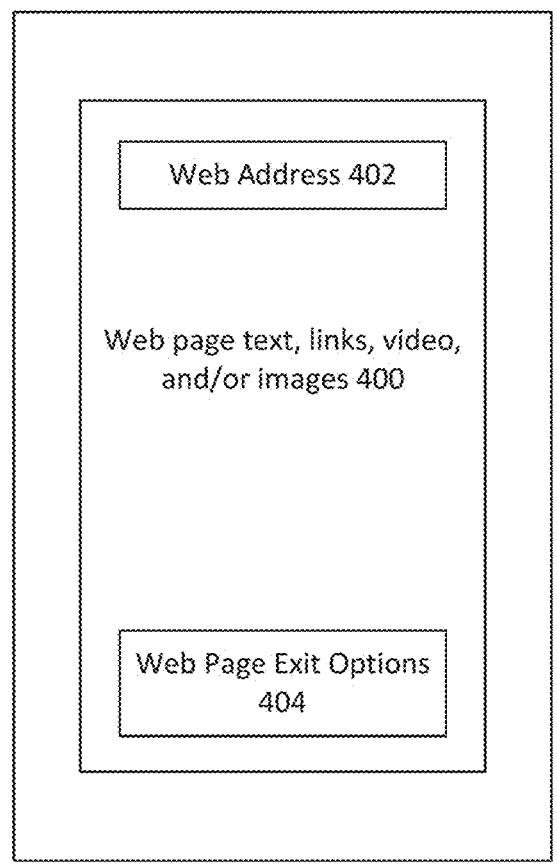

When the received input is the same as or exceeds the at least one reference value (e.g., a threshold downward scroll, an upscroll received subsequent to the downscroll, a selection of a browser navigation button, a detected change in display screen size of the web browser, a selected webpage exit option, and the like) has been received at operations 54, 56 as shown in FIG. 1A or operation 106 as shown in FIG. 1B (i.e., "Yes" as shown in FIG. 1B), a user interface may be displayed on and/or adjacent to the display 400 on the mobile computing device 10, 11 at operation 108. For example, as shown in FIG. 2B, when a scrolling input value meets and/or exceed the reference value (e.g., a downscroll exceeds a threshold value, and/or an upscroll is received after a downscroll, or the like), a web address input area 402 (e.g., a web address bar) and/or a web page exit options 404 may be displayed as part of or adjacent to the display 400 of the mobile computing device 10, 11. The web address input area may receive input from a user to change a web address of the web browser. For example, the address may be changed to be a different portion of the same website, or may be changed to an address of a different website than is presently being displayed on display 400. Web page exit options 404 may include, for example, a back button and/or forward button (e.g., to visit a portion of a web site or a different web site viewed before or after the presently displayed page, respectively), a menu button, a bookmarks button, and/or provide an interface to access web browsing history to retrieve a previously-viewed webpage. Web page exit options 404 may include an option to open another tab in the web browser of display 400 so load and/or view another web page. Web page exit options 404 may include a bookmarks list button so that a user may access websites that are bookmarked, which may be different than the current webpage being displayed in display 400.

The display of the user interface of the mobile computing device 108 may be different based on, for example, a type of mobile computing device 10, 11 (e.g., the brand, model, or the like), the operating system of the mobile computing device 10, 11 (e.g., iOS™, Android™, Windows™ Mobile, or the like), and/or the web browser user (e.g., Chrome™, Safari™, or the like).

For example, with a mobile computing device 10, 11 that operates with the Android™ operating system and is using a Chrome™ web browser, operation 108 may occur when the user scrolls towards the top of the webpage, and the browser's native navigation bar expands (e.g., web address area 402 expands in the display 400). In another example, with a computing device 10, 11 that operates with the iOS™ operating system and a Chrome™ web browser, operation 108 may occur when the user scrolls towards the top of the page and the browser's native navigation bar expands (e.g., web address area 402 expands in the display 400). If user selects (e.g., taps with a finger, etc.) on navigation bar (e.g., the web address input area 402), the iOS™ operating system may automatically scroll user to the top of the web page, and operation 108 may be performed. In another example, with the computing device 10, 11 that operates with the iOS™ operating system and a Safari™ web browser, when user selects the navigation bar (e.g., the web address bar 402) and the navigation bar (e.g., the web address bar 402) and/or the footer options (e.g., web page exit options 404) expand, or when the user taps the bottom of the screen and the web address bar 402 and the web exit options 404 are expanded, or when the user scrolls towards the top of the display 400.

The mobile computing device 10, 11 and/or a server (e.g., server 13 and/or remote platform 17 shown in FIGS. 4-5) may generate and/or select information to be displayed on display 400 at operation 110, or which may be overlaid (e.g. as overlay display 408) onto display 400 at operation 110. The information generation and/or selection may occur at any time before operation 110. For example, the information may be generated and/or selected before exit intent is determined, and/or before an input is received at operation 52, and/or before a scroll operation is received at operation 104.

Information that may be of interest or relevance to a user may generated, or selected from a stored set of information. For example, the information may be information that the user may have been looking for on the web page (e.g., when a slide operation, a scroll operation, a selection of a browser navigation button, a change in display screen size of the web browser, a webpage exit option or the like are selected), but the user could not locate information of relevance. That is, information may be generated and/or selected so as to be displayed at operation 110 that has not previously been presented to the user on the web page in display 400.

The information may include, for example, text information, graphical information, video, information, options to download or purchase an application, a link to another web page (e.g., within the web page) and/or a different web site, offers for coupons and/or savings on a product and/or service, and/or any other suitable information. In some embodiments, the information may include, for example, advertisements, promotional materials and/or offers, coupons, discounts, and the like. The information selected and/or generated are discussed below in context with different types of webpages.

That is, at operation 58 shown in FIG. 1A or at operation 110 shown in FIG. 1B, the generated and/or selected information may be displayed at the mobile computing device. As described above, this information may be to engage the user with the web site, provide the user with information of interest, and/or redirect the user to applications, web sites, and/or other information of interest to the user. The interest of the user, generation of information, and/or the selection of information may be displayed as an overlay display 408 to the display 400, or the display 400 may be dynamically altered to include the generated and/or selected information.

Figure 1C:
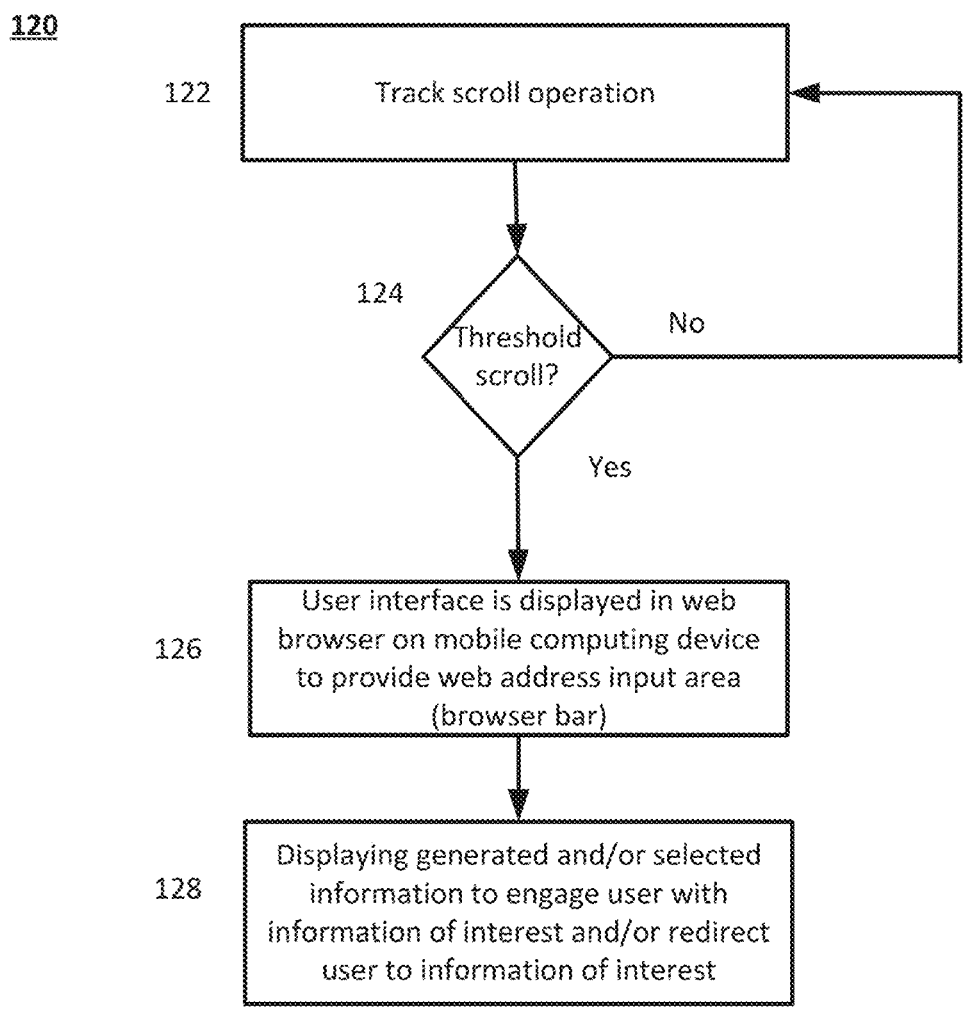
FIG. 1C shows another an example method of determining exit intent by tracking a scrolling operation to detect an activation of a web address input area (e.g., browser bar) according to an embodiment of the disclosed subject matter.

FIG. 1C shows another an example method 120 of determining exit intent by tracking a scrolling operation to detect an activation of a web address input area (e.g., browser bar) according to an embodiment of the disclosed subject matter. In operation 122, the mobile computing device 10, 11 may track a scroll operation that has been received by a user interface (e.g., user input device 26 shown in FIG. 3) and/or detected by the device 10, 11 (by user input detector 30 shown in FIG. 3). That is, the direction (e.g., upward, downward, etc.) and/or the magnitude of the scroll (e.g., the calculated and/or tracked velocity of a scroll input, the length of the touch input on a touch screen and/or other input device of the computing device 10, 11, or the like) may be tracked. For example, a downscrolling operation may be tracked as the user may select to view more content of a displayed webpage, and an upscroll operation may be subsequently detected. At operation 124, the detected upscroll operation may exceed a predefined threshold magnitude such that a web address input area 402 as shown in FIG. 2B (e.g., browser bar) is displayed at operation 126. If, at operation 124, the magnitude and/or direction of the scroll operation is less than the predetermined threshold values for magnitude and/or direction, operation 122 is performed so as to continue to track the scrolling operations received from a user of the mobile computing device 10, 11.

When the web input address area is displayed on the mobile computing device at operation 126 based on the magnitude and/or direction of the scrolling operations being equal to or greater than the predetermined threshold values, the mobile computing device 10, 11 and/or a server (e.g., server 13 and/or remote platform 17 shown in FIGS. 4-5) may generate and/or select information to be displayed on display 400, or which may be overlaid (e.g. as overlay display 408) onto display 400, at operation 128. Operation 128 may be similar to operation 110 as discussed in detail above. That is, scroll operations may be tracked so as to determine an exit intent by the user. For example, a change in scroll direction so as to activate and/or display the web address input area, and/or an increase in detected magnitude of the scroll operation so as to activate and/or display the web address input area may be determined as a user exit intent. Information that may be of interest to the user may be presented via an overlay or by dynamically altering the content of the displayed webpage so as to engage the user.

Figure 1D:
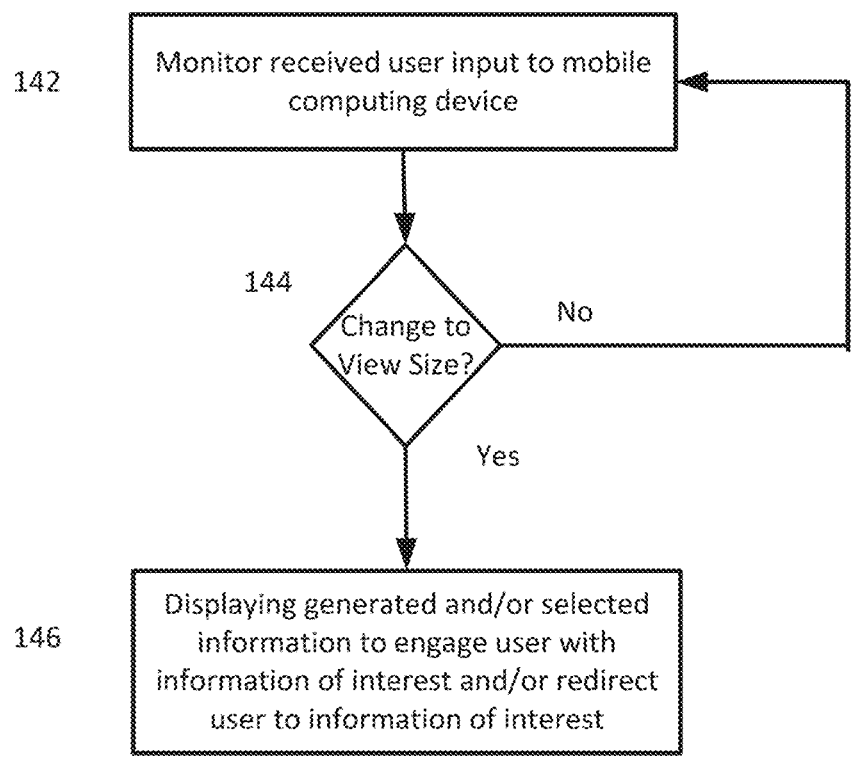
FIG. 1D shows another an example method of determining exit intent by determining a change in size of a viewable webpage area according to an embodiment of the disclosed subject matter.

FIG. 1D shows another an example method 140 of determining exit intent by determining a change in size of a viewable webpage area according to an embodiment of the disclosed subject matter. At operation 142, the mobile computing device 10, 11 may monitor and/or detect input received from a user. Based on the received input, the mobile computing device 10, 11 may operate so as to change the display presented to the user. For example, the mobile computing device 10, 11 may present a display 400 as shown in FIG. 2A, and the display may change to include web address area 402 and/or web page exit options 404 as shown in FIG. 2B when one or more user inputs are received. Operation 144 may determine whether there is a change to the viewable size of the display 400. The portion of display 400 having the webpage may decrease when web address area 402 and/or web page exit options 404 are displayed. That is, the mobile computing device 10, 11 and/or server 13 may determine that the change in the viewable size of display 400 may be a user exit intent at operation 144.

When a change in viewable display size is detected at operation 144, the mobile computing device 10, 11 and/or a server (e.g., server 13 and/or remote platform 17 shown in FIGS. 4-5) may display information that is previously generated and/or selected onto display 400, or which may be overlaid (e.g. as overlay display 408) onto display 400, at operation 146. Operation 146 may be similar to operation 110 as discussed in detail above.

In an embodiment of the disclosed subject matter, the user computing device operation 142 shown FIG. 1D may monitor a selection (e.g., a tap and/or touch by a user on a touch screen, or the like) by the user. The user input determined at operation 142 may control the mobile computing device 10, 11 to display the web address input area 401 and/or the web page exit options 404 shown in FIG. 2B. When such an input is detected, the mobile computing device 10, 11 and/or a server (e.g., server 13 and/or remote platform 17 shown in FIGS. 4-5) may display, at operation 146, information that is previously generated and/or selected on display 400, or which may be overlaid (e.g. as overlay display 408) onto display 400. That is, operation 146 may be similar to operations 110 and 128 as discussed in detail above. That is, the received user input that may control the mobile computing device 10, 11 so as to display a web address input area 402 and/or a web page exit options 404 may be determined to be a user exit intent, and information of interest may be provided to the user via an overlay and/or by dynamically altering the content of the displayed web page, as discussed in detail above.

Figure 4:
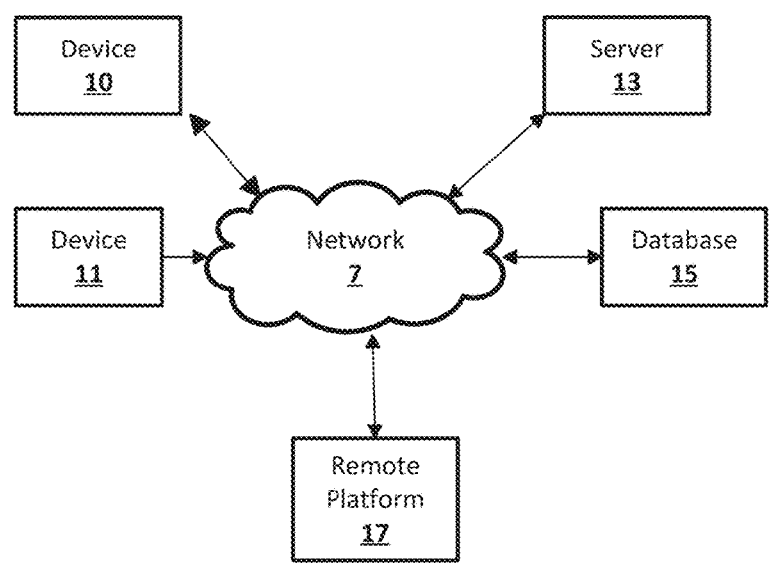
FIG. 4 shows a network configuration according to an embodiment of the disclosed subject matter.
Figure 5:
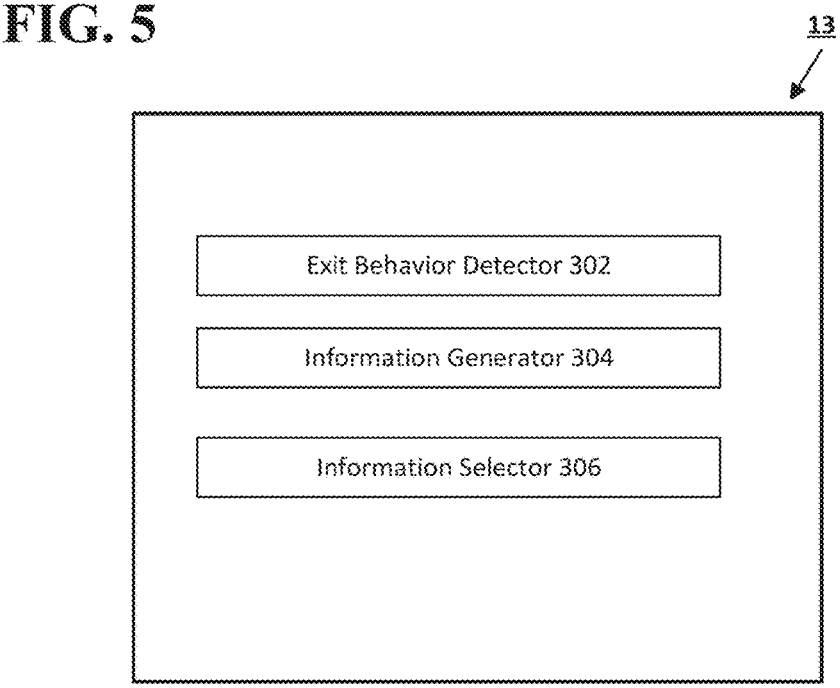
FIG. 5 shows a server configuration according to an embodiments of the disclosed subject matter.

In an embodiment of the disclosed subject matter, when the mobile computing device 10, 11 is operated so that the web address input area 402 and/or the web page exit options 404 are displayed (e.g., as shown in FIG. 2B), an exit intent may be determined by the mobile computing device 10, 11 and/or a server (e.g., server 13 and/or remote platform 17 shown in FIGS. 4-5). That is, when the mobile computing device 10, 11 operates so as to change the display 400 such that the web address input area 402 and/or the web page exit options 404 are displayed, the mobile computing device 10, 11 and/or the server may generate and/or select information to be displayed on display 400 (e.g., the display 400 may be dynamically altered so as to include the generated and/or selected information), or which may be overlaid (e.g. as overlay display 408) onto display 400, as described in detail above in connection with other embodiments.

In another embodiment of the disclosed subject matter, operation 142 shown in FIG. 1D may monitor whether a user input is received for an operation which reloads a previously-viewed website (e.g., a 'back' operation, a 'forward' operation, or the like). For example, one or more options may be selected from the web page exit options 404 shown in FIG. 2B. The receipt of such a selection may be determined by the mobile computing device 10, 11 and/or the server 13 to be a user exit intent. That is, in this embodiment, operation 144 shown in FIG. 1D may be omitted when a user input is received when a back button or other web page exit option is selected, and operation 146 may be performed so as to generate and/or select information to be displayed in an overlay on the display and/or dynamically adjust the presently-displayed webpage so as to present the generated and/or selected information as discussed in detail above.

In an embodiment of the disclosed subject matter, the mobile computing device 10, 11 may receive a selection to add a browser tab, view one or more browser tabs that may be open, toggle between open browser tabs, or the like via the web page exit options 404 shown in FIG. 2B. When such a selection is received, display 420 shown in FIG. 2D may be displayed on the mobile computing device 10, 11. The display 420 may include a first webpage tab 422, a second webpage tab 424, and/or a third webpage tab 426. Although three webpage tabs are shown in FIG. 2D, there may be any suitable number of tabs shown in display 420 arranged in a horizontal, vertical, and/or any other suitable arrangement, where each tab is associated with a different webpage that may be selected by a user to be displayed (e.g., where the selection of a tab expands the page displayed such as display 400 shown in FIG. 2A).

Figure 2C:
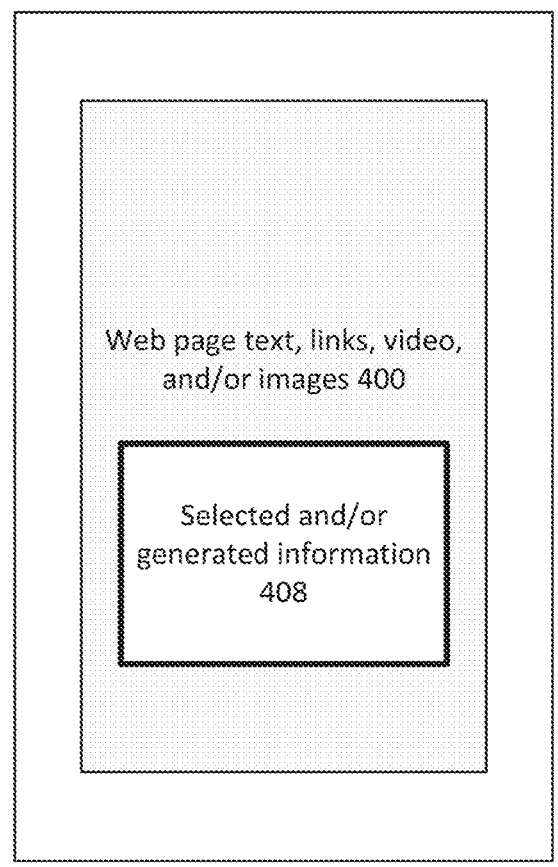
Figure 2D:
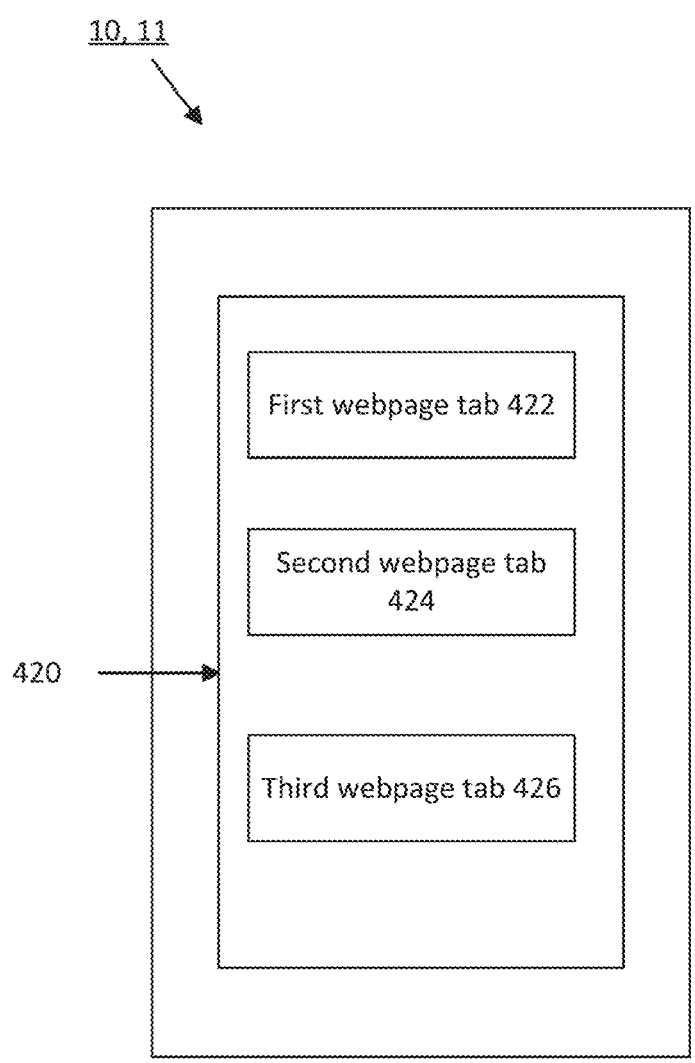
FIG. 2D shows an example display of a mobile computing device with one or more webpage tabs which, when displayed, may be used to determine exit intent according to an embodiment of the disclosed subject matter.

When a browser tab is added to the display 420 as described above, the mobile computing device 10, 11 and/or the server 13 may generate and/or select information to be displayed on the display (e.g., the display may be dynamically altered so as to include the generated and/or selected information), or which may be overlaid (e.g. as overlay display 408) onto the display 400 (e.g., as shown in FIG. 2C and as described above.

Figure 2E:
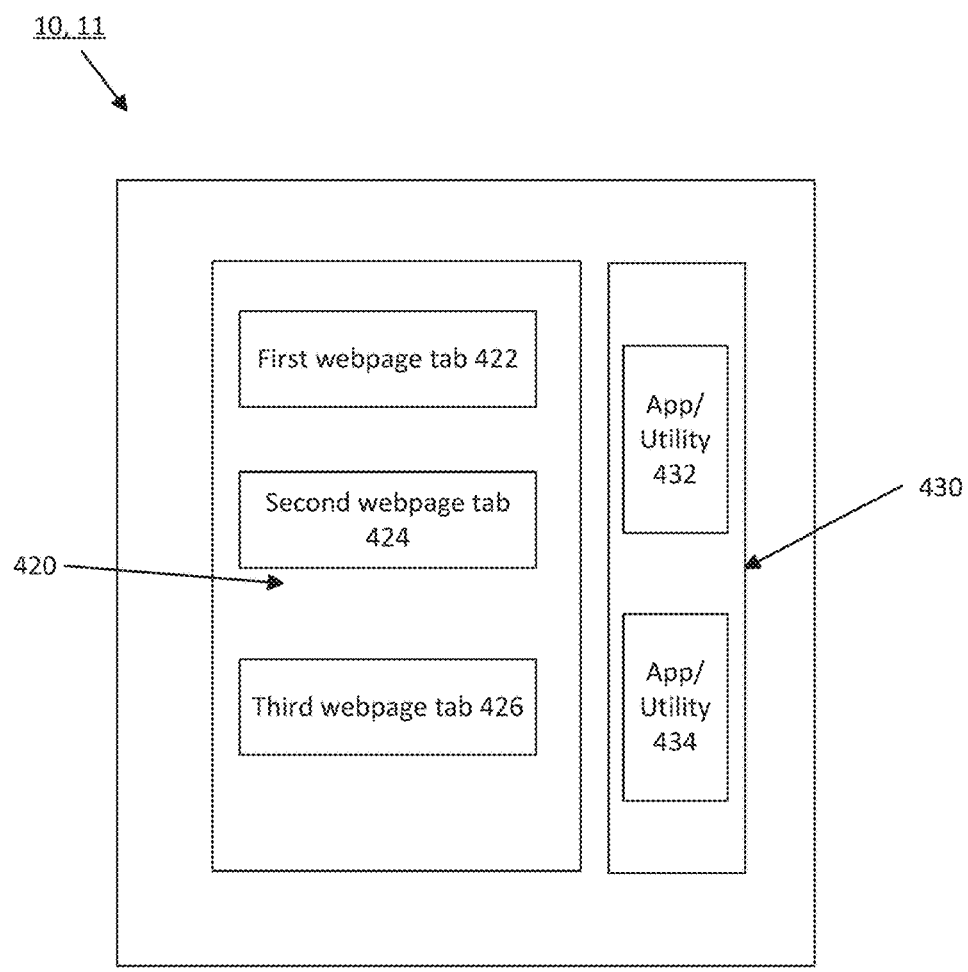
FIG. 2E shows an example display of a mobile computing device which includes webpage display tabs and an application and/or utility display area which, when displayed, may be used to determine exit intent according to an embodiment of the disclosed subject matter.

In an embodiment of the disclosed subject matter, the mobile computing device 10, 11 may receive in an input from the user so that the a webpage and/or web page tabs are displayed in display 420 as shown in FIG. 2E, and such that display 430 which may include one or more applications and/or utilities 432, 434 (e.g., applications and/or utilities such as weather, phone, settings, music, maps, and the like). When an operation is received so that displays 420, 430 are presented, the mobile computing device 10, 11 and/or the server 13 may generate and/or select information to be displayed on the display (e.g., the display may be dynamically altered so as to include the generated and/or selected information), or which may be overlaid (e.g. as overlay display 408) onto the display 400 (e.g., as shown in FIG. 2C and as described above. Although displays 420 and 430 are shown in FIG. 2C, these are merely example displays, and one or more other displays may be presented on the mobile computing device 10, 11. That is, a plurality of displays may be presented on the mobile computing device such that a user may select a webpage, one or more applications, one or more utilities, or the like. When a plurality of such displays are presented based on the operation of the mobile computing device 10, 11, an overlay may be displayed with selected and/or generated information, and/or a portion of one or more the displays may be dynamically altered so as to display the information.

There may be a plurality of cases where it may be desirable to generate and/or select information, and present it to the user. This may be to provide information that the user may be searching for, but was unable to locate when scrolling the web page of display 400.

For example, method 50 and/or method 100 may be used to determine when the user is no longer engaged with the web page presented in display 400. When an input is received (e.g., a slide operation, a selection of a browser navigation button, a change in display screen size of the web browser, a webpage exit option, or the like) that meets or exceeds a reference value or the user executes a scroll operation that exceeds the threshold scroll input value such that they might intend to exit the presently displayed webpage, information may be generated and/or selected to be presented to the user in the display 400 (i.e., where the content of display 400 is dynamically altered) and/or an overlay display 408. As discussed above, the threshold scroll input value may be a scroll in a first direction that is equal to or exceeds a threshold value, or may be a scroll detected in an opposite direction from a first detected scroll (e.g., an upscroll detected subsequent to a downscroll operation), or the like.

The mobile computing device 10, 11 may determine that the user would like to receive additional information, and the display 408 may include information about how to receive information, and may include an option for the user to enter information such as an email address, phone number, mailing address, and/or any other suitable contact information.

In one example, a user may conduct a search using a search website. A website owner may have an arrangement with the search website so as to promote certain aspects of the owner's business or certain related webpages on the owner's website when a search for content that is related to the website owner is searched for. For example, the first result in the list of search results of the name of the website owner may be a link to specific content, a particular business unit or business function of the owner. A user conducting a search via the mobile computing device may select this link associated with this first search result without realizing it will lead to the specific content, business unit or business function. An exit intent may be detected, as described above, as the user may wish to abandon the search result website, due to lack of interest and/or the website not being what the user was searching for. When the exit intent is detected, as described above, a display 408 may provide information and/or content to address the search made by the user, and/or may provide a link to a webpage having information that may be of interest to the user (e.g., based on the search query, the user browser history, or the like).

In another example, a user may be viewing an article on a website displayed by the mobile computing device 10, 11. As described above, an exit intent may be detected, and the display 408 may prompt the user to query whether they would like the article being viewed to be emailed to them. The display 408 may be used to capture an email (e.g., a user may enter their email address in the display 408), or may provide a link to a webpage for the user to enter their email address. Alternatively, or in addition, a link to the article may be emailed to the user. The display 408 may query the user as to whether they would like to save their reading position in the article, so that they may return to the webpage again at the same location to resume reading.

Similar to the example above, a user may be finalizing a form for a request for information in the display 400, but may not include all of the required information. The information may not be provided by the user inadvertently, and/or the user may not understand what information is being requested from them, or the like. An exit intent may be detected before the form is complete and/or submitted. For example, the user may have attempted to submit the form, but may be have received an error message that the form was not submitted and the user may attempt to leave site early, as they do not understand what information still needs to be provided. The information provided, for example, in the display 408 may point out to the user what information still needs to be provided to complete form before user exits site, and/or may offer examples of how to complete the form.

In another example, when a user has completed reading an article that is being viewed in display 400 of the mobile computing device 10, 11, an exit intent may be detected, as described above. That is, the user may desire to exit the webpage, as the user has completed reading. Alternatively, in this example, the user may visit the website, but content may be displayed that the user is not interested in (e.g., promotional content for a product, service, and/or content that the user is not interested in), which may prompt the user to attempt to exit the website. When the exit intent is detected, an article, product, service, content, information, and/or media recommendation may be displayed in the display 408. In some embodiments, the display 408 may include link to the article, product, service, content, information, and/or media, and/or a summary of the same. The mobile computing device 10, 11 and/or a server 13 may generate the recommendation. The recommendation may be based on, for example, at least one of an article, service, product, content, information, media, information, or the like that the publisher wishes to promote, the user viewing history, or the like.

In yet another example, a user may be viewing a website in display 400 of the mobile computing device 10, 11, and an exit intent may be determined. For example, the user may not be able to locate the content, product, service, information, media, or the like that they may be looking for, and may attempt to exit the website. When an exit intent is determined, the display 408 may be presented which may provide a suggestion for a category and/or product, service, media, and/or information page to the user. In some embodiments, a link to the category page or the product, content, service, information, and/or media page may be provided in the display 408. Such links to these webpages may be provided, for example, when it is determined that the user has not visited these webpages, and the products presented on the pages may be relevant to the user, given their search history, search query, or the like. In some embodiments, an incentive may be provided (e.g., a discount, a coupon, and offer for reduced cost content or subscription, or the like) so as to retain the interest of the user. This incentive may be related to the content that is linked to in the display 408. This incentive may be to encourage the user to select the recommended link for the product, service, information, media, or the like that is provided in the display 408.

In another example, when a webpage displayed in display 400 of the mobile computing device 10, 11 that requests that a user provide information, upon detection of an exit intent when a user has not completed a request for information (e.g., name, mailing address, phone number, email address, or the like), the display 408 may provide one or more incentives (e.g., additional information, discounts, membership privileges, special access to content and/or information, or the like) for the user to complete the entry of information. For example, the display 408 may direct the user to enter information that has not been previously provided, and/or that may have been skipped inadvertently.

In yet another example, a user may be attempting to purchase an item from a website displayed in the display 400 of the mobile computing device 10, 11. An exit intent may be detected, for example, when the user does not complete the process of purchasing the item. The display 408 may provide a link to a purchase or redirect the user to complete the purchase when the exit intent is detected. For example, when an exit intent is detected, embodiments of the disclosed subject matter may attempt to re-engage the user with the webpage so as to encourage the purchase of an existing product or recommend a similar product to view and/or purchase. In one embodiment, the user may receive an incentive such as a coupon for a future purchase, or a discount on the purchase to be completed, and/or may be provided with any other suitable incentive. Alternatively, or in addition, when the exit intent is detected, the mobile computing device may present a display (e.g., an overlay or the like) to inform the user that the purchasing transaction has not been completed, provide guidance for completing the purchasing transaction (e.g., alert the user as to what information items need to be entered), and/or provide any suitable message to re-engage the user with completing the purchasing transaction.

Continuing with the example above, for items that may be priced above a predetermined pricepoint, and/or for sales of items that may typically occur over the phone than via a website, when a user attempt to exit the website presented in display 400 on the mobile computing device 10, 11, the display 408 may provide an selectable option to call a representative of the company selling the product. Alternatively, or in addition, the display 408 may provide a link to engage in a "live chat" via a messenger application and/or other text-based communication to facilitate the sale and/or exchange of information between the company and the user.

In another example, a user may view a website on the display 400 of the mobile computing device 10, 11. An application may be available that is related to the website that a user may be able enhance the content of the website and/or provide a better experience (e.g., the content may be easier to view, or the like). When an exit intent is determined (e.g., when a user may be frustrated with the display of content, operation of the website, or the like), the display 408 may include a link and/or an option for a user to download the application to provide a user experience for interacting with and/or viewing content using the mobile computing device 10, 11.

Continuing the example above, a user may attempt to engage with a forum on a website, such as view posts to the forum and/or make posts. The user may have difficulties or may become frustrated in attempting to engage with the forum from a mobile computing device, and may attempt to exit the web forum. When an exit intent is detected, as described above, an overlay (e.g. overlay display 408) may be displayed so as to incentivize the user's participation in the forum, such as reading posts and/or writing posts. For example, the displayed incentive may provide the user with an opportunity to receive discounts on products, services, subscriptions for media content, and the like. The displayed incentive may include a link to purchase the product, service, media subscription, or the like.

In another example, an exit intent may be determined, and the display 408 may provide promotional information to the user. In some embodiments, the user webpage viewing history may be used to determine whether a user has viewed any promotional materials and/or offers about a product, service, and/or information. When the user has not viewed any promotional content, or may have viewed the promotional content less than a predetermined number of times, the display 408 may provide information relating to the promotion. For example, the information may include the time period that the promotion is offered, the value of the promotion, the products, services, and/or information available via the promotion, and/or any other suitable information.

In some embodiments, the display 408 may include a link to a webpage that may be of interest to the user. The selection of the link may be based on the user's browsing and/or viewing history. When providing the link, the display 408 may provide a summary of information of the information in the page that the link is to.

In one example, a user may attempt to view a webpage using the mobile computing device 10, 11. Communications link interruptions, network connectivity issues, and/or a failure for website to load as quickly as desired by the user (e.g., due to the content and/or advertising on the site which may need increased bandwidth), may prompt an exit intent of the user, which may be determined as discussed above. A substitute website and/or similar website and/or link to download an application related to the website could be recommended to the user, and may be displayed, for example, in overlay display 408. Alternatively, the display 400 may be dynamically altered so as to include a link to the website and/or a summary about the information to be found at the website.

In yet another example, the user may be conducting a search for information (e.g., using a search website or search function of the web browser), and may be selecting one or more links in the search results to view websites to determine whether the information presented on a website is relevant. When viewing a selected website, the user may attempt to exit a site when the user may not be able to locate the information the user is looking for. When an exit intent is detected as described above, an overlay (e.g., overlay display 408) may be displayed which may provide a recommendation for a website which contains relevant information that a user is looking for. This may be determined, for example, based on the user's browsing history or search history, such as search terms used, or the like. The recommendation may include a summary of the website, and/or a portion of the relevant information. Alternatively, or in addition, the content of the web page displayed on the mobile computing device may be dynamically altered (e.g., using date received by the mobile computing device from a server, a database, or the like) so as to include the recommended website, a summary of the website contents and/or at least a portion of the information that may be relevant to the user.

Continuing with the example above, the user may attempt to locate information within a website, such as hours of operation of a retail store associated with the website, contact information (e.g., email address phone number, or the like) associated with the retail store, or location of the retail store, but the user may want to exit because they cannot find the information that they are looking for. For example, the information may not be displayed on the webpage that the user is viewing, or is not displayed and/or featured on the website (e.g., overlay display 408) such that the user can find it. When an exit intent is determined, as described above, an overlay may be displayed that may direct the user to another location of the same site that has the information (e.g., the hours of the retail store, the phone number of the store, the location of the retail store or the like), may present such information in the overlay itself, and/or may direct the user to a different website with the information. Alternatively, the content of the website may be dynamically altered so as to include the information that the user was looking for so that it is highlighted and/or featured. Alternatively, or in addition, when an exit intent is determined when a user has visited a predetermined number of pages (e.g., one page, two pages, three pages, or the like), the display 408 may be provided and may include a store locator, so that the user may find the retail store that is nearest to them.

In another example, the user may find product on a website that the user is interested in, but the product may be presently unavailable. For example, the product may be out of stock, not released yet, presently unavailable in the country, or the like. When an intent to exit the website is determined, an overlay may be displayed so as to direct the user to a different portion of the website so that the user may find presently available similar products or may enter contact information, so that the user may be informed when product is available. Alternatively, the user may enter contact information into one or more areas of the overlay. In another alternative, the website displayed by the mobile computing device may be dynamically altered (e.g., using date received from a server and/or database) so that a user may enter contact information.

In the examples above, the generated and/or selected information may be displayed in the overlay display 408, or the webpage displayed in display 400 may be dynamically altered so as to include the generated and/or selected information.

One or more embodiments of the disclosed subject matter may detect exit intent and may generate and/or select information based on the example code below:

```
var isChrome =
navigator.userAgent.toLowerCase( ).indexOf('chrome') > -1,
      isSafari =
navigator.userAgent.toLowerCase( ).indexOf('safari') > -1;
   var ca_id = 158002;
   var scroll_pct = 80;
     if (isChrome) {
        var direction = 'up';
        var trigger_pct = 10;
        bouncex.campaigns[ca_id].oldy = jQuery(window).scrollTop( );
        bouncex.documentHeight = jQuery(document).height( );
        winheight = jQuery(window).height( );
        bouncex.highestScrollreached = false;
        bouncex.wind = bouncex.wndsize( );
jQuery(window).bind('scroll.bouncex_scroll_'+ca_id,function(event
){
        var scroll = jQuery(window).scrollTop( );
        if(bouncex.campaigns[ca_id].oldy==scroll){
           return false;
        }
        var up = (bouncex.campaigns[ca_id].oldy > scroll);
        bouncex.campaigns[ca_id].oldy = scroll;
        var pos = ((scroll +
bouncex.wind.height)/bouncex.documentHeight)*100;
        var diff = (pos)+(scroll_pct);
        var scrolled =
(jQuery(window).scrollTop( )/(bouncex.documentHeight -
winheight))*100;
        if(direction=='up' && up &&
(diff>100||bouncex.highestScrollreached)){
                 if(scrolled<=trigger_pct){
                 // campaign and/or information generation trigger
                 code here
                 }
                 bouncex.highestScrollreached=true;
        }else if(direction=='up' && !up){
             bouncex.campaigns[ca_id].ad_visible=true;
                if(scrolled>0.5){bouncex.close_ad(ca_id);}
        }else if(direction=='down' && !up && diff>100){
                 // campaign and/or information generation trigger
                 code here
        }else if(direction=='down' && up){
                 bouncex.close_ad(ca_id);
        }
});
   } else if (isSafari){
      bouncex.highestScroll = jQuery(window).scrollTop( );
      bouncex.highestScrollreached = false;
      bouncex.windsize=bouncex.wndsize( );
      bouncex.wheight=bouncex.windsize.height;
      bouncex.wwidth=bouncex.windsize.width;
      bouncex.orientation=window.orientation;
      bouncex.documentHeight = jQuery(document).height( );
      bouncex.mobtimeout;
jQuery(window).bind('scroll.bouncex_scroll_'+ca_id,function(event
){
```

```
      var scroll = jQuery(window).scrollTop( );
      if(bouncex.highestScroll<scroll){
         bouncex.highestScroll = scroll;
      }
});
jQuery(window).resize(function( ){
         clearTimeout(bouncex.mobtimeout);
         bouncex.mobtimeout = setTimeout(function( ){
            bouncex.windsize=bouncex.wndsize( );
            if(bouncex.windsize.width!=bouncex.wwidth ||
bouncex.windsize.height*2<bouncex.wheight ||
bouncex.orientation!=window.orientation){
                    bouncex.close_ad(ca_id, true);
               }else{
                    var pos = ((bouncex.highestScroll +
bouncex.windsize.height)/bouncex.documentHeight)*100;
                    var diff = (pos)+(scroll_pct);
                    if((bouncex.windsize.height+10)<bouncex.
wheight && (diff>100||bouncex.highestScrollreached)){
                         // campaign and/or information
                         generation trigger code here
                         bouncex.highestScrollreached=true;
                    }else{
                         bouncex.close_ad(ca_id, true);
                    }
               }
               bouncex.orientation=window.orientation;
               bouncex.wwidth = bouncex.windsize.width;
               bouncex.wheight = bouncex.windsize.height;
         },100);
});
   }
```

In the example code above, the type of web browser used by the mobile computing device 10, 11 may be determined. When an input scroll value is greater than a predetermined value (e.g., a predetermined percentage of the web site has been scrolled) and/or a second scroll operation is detected subsequent to a first scroll operation (e.g., an upscroll is detected subsequent to a downscroll operation), an exit intent may be determined. This may trigger the generation and/or selection of information to be provided to a user (e.g., in an overlay that is displayed and/or by dynamically altering the content of the webpage being displayed). The code example includes two scroll activation conditions to determine exit intent, and a third activation condition based on a change in the size of the viewable webpage area to determine exit intent.

Figure 3:
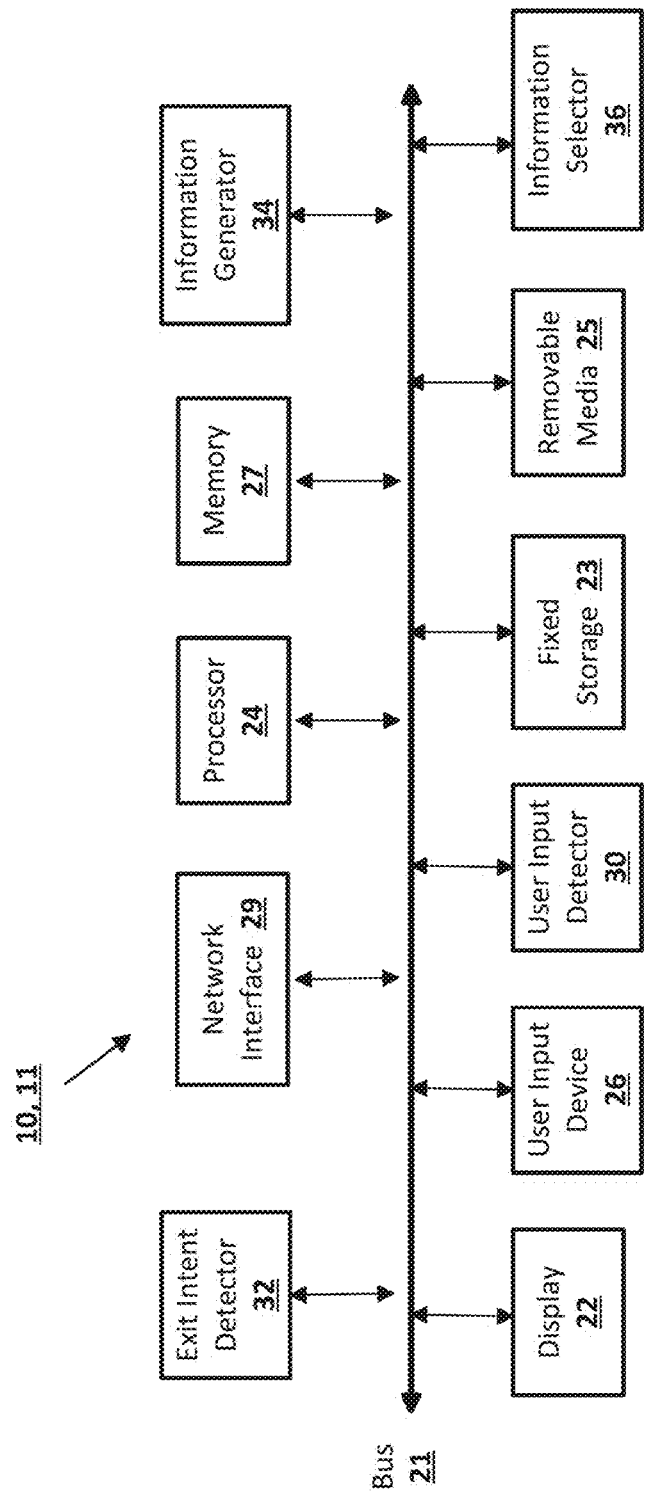
FIG. 3 shows a mobile computing device according to an embodiment of the disclosed subject matter.

Embodiments of the presently disclosed subject matter may be implemented in and used with a variety of component and network architectures. FIG. 3 is an example mobile computing device 10, 11 suitable for implementing embodiments of the presently disclosed subject matter. The device 10, 11 is shown in the context of a communication network in FIG. 4. The device 10, 11 may be, for example, a mobile computing device such as a smart phone, tablet, wearable computing device, or the like. The device 10, 11 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection. The device 10, 11 may optionally include one or more of a user input detector 30, an exit intent detector 32, an information generator 34, and/or an information selector 36.

The bus 21 allows data communication between the central processor 24 and one or more memory components, which may include RAM, ROM, and other memory, as previously noted. Typically RAM is the main memory into which an operating system and application programs are loaded. A ROM or flash memory component can contain, among other code, the Basic Input-Output system (BIOS) which controls basic hardware operation such as the interaction with peripheral components. Applications resident with the device 10, 11 are generally stored on and accessed via a computer readable medium, such as a hard disk drive (e.g., fixed storage 23), an optical drive, solid state drive, or other storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field, and the like. For example, the network interface 29 may allow the computer to communicate with other computers via one or more local, wide-area, or other communication networks, as described in further detail below.

User input detector 30 may include an integrated circuit, a processor, a programmable logic device, a sensor, and/or computer instructions implemented on a processor (e.g., processor 24) to detect input from a user via the user input device 26 and/or the display 22 (e.g., a touch-screen display). For example, the user input detector 30 may detect an input by the user to perform a slide operation, a scroll operation, a selection of a browser navigation button, a change in display screen size of the web browser, a webpage exit option, or the like. In one example, the user input detector 30 may determine the magnitude and/or direction of one or more scroll operations. In some embodiments, the user input detector 30 may determine a percentage of a webpage displayed on the display 22 of the device 10, 11 is scrolled. In some embodiments, the user input detector 30 may determine when a second scroll is received that is an opposite direction than a first detected scroll operation.

Exit intent detector 32 may include an integrated circuit, a processor, a programmable logic device, a sensor, and/or computer instructions implemented on a processor (e.g., processor 24) to determine an intent of a user to exit a webpage displayed on display 22 of the device 10, 11. For example, the exit intent detector 32 may use, at least in part, a detection by the user input detector 30 of a scroll operation to determine an exit intent. In some embodiments, the exit intent detector 32 may determine an exit intent when a received input value (e.g., for a slide operation, a selection of a browser navigation button, a change in display screen size of the web browser, a webpage exit option) is the same as or exceeds the at least one reference value. In some embodiments, the exit intent detector 32 may determine an exit intent when and/or a magnitude and/or direction of a scroll operation is equal to or greater than a predetermined input scroll value. In some embodiments, the exit intent detector 32 may determine an exit intent when there is a change in direction between a first detected scroll operation and a subsequently detected scroll operation.

Information generator 34 may include an integrated circuit, a processor, a programmable logic device, a sensor, and/or computer instructions implemented on a processor (e.g., processor 24) to generate information to be displayed in display 22 (e.g., in display 408 shown in FIG. 2C) when an exit intent is detected (e.g., by exit intent detector 32). The information generator may determine a link to a webpage and/or website, and/or provide information to a user which may be of relevance (e.g., according to a user's website viewing history, search queries, or the like).

Information selector 36 may select one or more pieces of information generated by the information generator, and may display the selected information on the display 22. In some embodiments, the information generator 34 and the information selector 36 may be part of the same processor, integrated circuit, programmable logic device, or the like. In some embodiments, the information generator 34 and the information selector 36 may be part of a server (e.g., server 13 shown in FIGS. 4-5 and described below).

Many other devices or components (not shown) may be connected in a similar manner (e.g., document scanners, digital cameras and so on). Conversely, all of the components shown in FIG. 3 need not be present to practice the present disclosure. The components can be interconnected in different ways from that shown. The operation of a computer such as that shown in FIG. 3 is readily known in the art and is not discussed in detail in this application. Code to implement the present disclosure can be stored in computer-readable storage media such as one or more of the memory 27, fixed storage 23, removable media 25, or on a remote storage location.

FIG. 4 shows an example network arrangement according to an embodiment of the disclosed subject matter. One or more devices 10, 11, such as smart phones, tablet computing devices, wearable computing devices and the like may connect to other devices via one or more networks 7. Each device 10, 11 may be a computing device as previously described. The network may be a local network, wide-area network, the Internet, or any other suitable communication network or networks, and may be implemented on any suitable platform including wired and/or wireless networks. The devices 10, 11 may communicate with one or more remote devices, such as servers 13 and/or databases 15. The remote devices may be directly accessible by the devices 10, 11, or one or more other devices may provide intermediary access such as where a server 13 provides access to resources stored in a database 15. The devices 10, 11 also may access remote platforms 17 or services provided by remote platforms 17 such as cloud computing arrangements and services. The remote platform 17 may include one or more servers 13 and/or databases 15.

FIG. 5 shows a server 13 according to an embodiment of the disclosed subject matter. The server 13 may include, for example, an exit behavior detector 302, an information generator 304, and/or an information selector 306 which may be one or more processors, integrated circuits, programmable logic devices, and/or computer instructions executed on the same. The operation of the exit behavior detector 302, the information generator 304, and/or the information selector 306 may be similar to exit intent detector 32, information generator 34, and/or information selector 36 described above in connection with FIG. 3.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus)

drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method comprising:
   determining, at a mobile computing device that displays a webpage in a web browser on a display, that an input to the web browser is received from a user, the input having at least one property selected from a group consisting of a slide operation, a scroll operation, a selection of a browser navigation button, a change in display screen size of the web browser, a webpage exit option, a force, a dwell time, a direction, a velocity, and an acceleration;
   comparing, at the mobile computing device, the determined at least one property of the received input with at least one reference value that corresponds to the at least one property, the at least one reference value stored at the mobile computing device, wherein the at least one reference value is based on a type of the received input, the at least one reference value being different for each at least one property;
   determining, based on the comparing at the mobile computing device, an intent to exit the displayed webpage when the determined at least one property of the received input is the same as or exceeds the at least one reference value;
   monitoring the web browser to determine when the webpage has changed from one which includes at least one identifying character located in a uniform resource locator (URL) of the webpage to one which the at least one identifying character is absent; and
   displaying, on the display of the mobile computing device, a message providing information of interest generated from a server when the at least one identifying character is absent and based on the determination of intent to exit the displayed web page.

2. The method of claim 1, wherein the message is displayed on the display of the mobile computing device when the display screen size of the web browser is determined to change based on the comparison between the determined at least one property and the at least one reference value.

3. The method of claim 1, wherein the message is displayed on the display of the mobile computing device when the comparison determines that at least one from the group consisting of a back button, a forward button, a bookmark list button, and a menu button is selected.

4. The method of claim 3, further comprising:
   transmitting, from the server to the mobile computing device, a window history state object that corresponds a web browser's currently displayed web page, and a custom triggering object;
   reading, at the mobile computing device, the custom triggering object when the forward button or back button is selected; and
   displaying the message, on the display of the mobile computing device, based on the custom triggering object.

5. The method of claim 1, wherein the determining the intent to exit is based on determining a configuration of the mobile computing device.

6. The method of claim 5, wherein the determining the configuration comprises:
   determining the configuration based on at least one from the group consisting of: an operating system, a model of the mobile computing device, a manufacturer of the mobile computing device, and at least one operational setting of the mobile computing device.

7. The method of claim 1, wherein the at least one reference value stored at the mobile computing device includes at least one from the group consisting of: a threshold scroll value, a threshold slide value, at least one value corresponding to a threshold change in the display screen size of the web browser.

8. The method of claim 7, wherein the scroll operation includes a downward scroll operation that is equal to or greater than the threshold scroll value, and an upward scroll operation.

9. The method of claim 1, further comprising:
   displaying, at the mobile computing device, at least one of a selectable image, selectable text, a selectable button, and a selectable link; and
   redirecting, at the mobile computing device, a user to information of interest based on a received selection of at least one of the selectable image, the selectable text, the selectable button, and the selectable link.

10. The method of claim 9, wherein the redirecting comprises:
    displaying, on the display of the mobile computing device, the information of interest in at least one from the group consisting of the displayed message, a different portion of a website that includes the displayed webpage, a new webpage of a different website from the displayed webpage, or an advertisement.

11. The method of claim 1, wherein the webpage exit option is selected from the group consisting of: a webpage tab a menu, a bookmark list button, a web address area, a home button, and an application.

12. The method of claim 1, wherein the received input of the scroll operation is selected from the group consisting of: an upward scroll operation and a downward scroll operation.

13. The method of claim 12, wherein the reference value is a threshold percentage of the webpage that is scrolled by the upward scroll operation or the downward scroll operation.

14. The method of claim 1, wherein the displaying the message comprises:
generating or selecting, at the server communicatively coupled to the mobile computing device, information to be generated or selected to be included with the message; and
transmitting, from the server to the mobile computing device via a communications network, the generated or selected information to be included in the message.

15. The method of claim 14, further comprising:
displaying, at the display of the mobile computing device, the at least one of the generated information and the selected information in an overlay or by dynamically adjusting the displayed webpage.

16. The method of claim 1, wherein the determination of the intent to exit is based on non-completion of a request for information from a user displayed on the display of the mobile computing device.

17. The method of claim 1, further comprising:
collecting data associated with a user or the mobile computing device, wherein the determining the intent to exit the displayed webpage is at least partially based upon the collected data associated with the user or the mobile computing device.

18. The method of claim 1, further comprising:
collecting data associated with a user or the mobile computing device;
based on the collected data associated with the user or the user device, determining at least one from the group consisting of: how the message is to be displayed on the display of the mobile computing device, and the content of the message.

19. The method of claim 18, wherein the data associated with the user or the mobile computing device is at least one from the group consisting of: the web browser of the mobile computing device; an operating system of the mobile computing device; whether a computer programming code has been enabled or disabled on the mobile computing device; a network connection speed of the mobile computing device; an enabled cookie on the mobile computing device; screen resolution settings of the mobile computing device; and received input to the web browser of the mobile computing device.

20. The method of claim 18, wherein the data associated with the user or the mobile computing device includes at least one from the group consisting of: user search criteria; user identification information; user preferences; user location; web browser information; characteristics of the mobile computing device; previous visit history with a web page; and referral history.

21. A method comprising:
determining, at a mobile computing device that displays a webpage in a web browser on a display, that an input to the web browser is received from a user, the input having at least a first operation input or a second operation;
comparing, by at least the mobile computing device, whether the received input is the same as or exceeds at least one reference value that corresponds to the at least one of the first operation input or the second operation input, the at least one reference stored at the mobile computing device;
determining, at the mobile computing device, an intent to exit the displayed webpage when it is determined that the received input from the user is the same as or exceeds the at least one reference value that is based on a type of the received input from the user that corresponds to the at least one of the first operation input or the second operation input, the at least one reference value being different for the first operation input and the second operation input;
monitoring the web browser to determine when the webpage has changed from one which includes at least one identifying character located in a uniform resource locator (URL) of the webpage to one which the at least one identifying character is absent; and
displaying, on the display of the mobile computing device, a message providing information of interest generated from a server when the at least one identifying character is absent and based on the determined intent to exit the displayed web page.

22. The method of claim 21, wherein the received first operation input or second operation input includes a downward scroll operation that is the same as or exceeds at least one reference value, and an upward scroll operation.

23. The method of claim 21, wherein the reference value is a threshold percentage of the webpage that is scrolled by the received first operation input or second operation input.

24. The method of claim 21, further comprising:
determining a contents of the displayed message based on the determined intent to exit.

25. The method of claim 21, further comprising:
collecting data associated with a user or the mobile computing device, wherein the determining the intent to exit the displayed webpage is at least partially based upon the collected data associated with the user or the mobile computing device.

26. The method of claim 25, wherein the data associated with the user or the mobile computing device is at least one from a group consisting of: the web browser of the mobile computing device; an operating system of the mobile computing device; whether a computer programming code has been enabled or disabled on the mobile computing device; a network connection speed of the mobile computing device; an enabled cookie on the mobile computing device; screen resolution settings of the mobile computing device; and received input to the web browser of the mobile computing device.

27. The method of claim 25, wherein the data associated with the user or the mobile computing device includes at least one from the group consisting of: user search criteria; user identification information; user preferences; user location; web browser information; characteristics of the mobile computing device; previous visit history with a web page; and referral history.

28. The method of claim 25, wherein the collected data associated with the user or the user device is at least partially used to determine the message to be displayed on the display of the mobile computing device.

* * * * *